United States Patent
Ribeiro et al.

(10) Patent No.: US 12,017,174 B2
(45) Date of Patent: *Jun. 25, 2024

(54) FILTER ELEMENT FOR MOUNTING IN AN AIR CLEANER HOUSING OF A VEHICLE

(71) Applicant: Volvo Truck Corporation, Gothenburg (SE)

(72) Inventors: Fabio Ribeiro, Curitiba (BR); Carl Löwstedt, Onsala (SE); Torbjörn Ågren, Gothenburg (SE); Mikael Karlsson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 365 days.

This patent is subject to a terminal disclaimer.

(21) Appl. No.: 17/429,888

(22) PCT Filed: Feb. 14, 2019

(86) PCT No.: PCT/EP2019/053638
§ 371 (c)(1),
(2) Date: Aug. 10, 2021

(87) PCT Pub. No.: WO2020/164708
PCT Pub. Date: Aug. 20, 2020

(65) Prior Publication Data
US 2022/0126232 A1    Apr. 28, 2022

(51) Int. Cl.
*B01D 46/42*    (2006.01)
*B01D 46/24*    (2006.01)
(Continued)

(52) U.S. Cl.
CPC ...... *B01D 46/4236* (2013.01); *B01D 46/2411* (2013.01); *B01D 46/521* (2013.01);
(Continued)

(58) Field of Classification Search
CPC .................. F24F 8/108; F24F 1/0071
(Continued)

(56) References Cited

U.S. PATENT DOCUMENTS

| 4,580,657 A | 4/1986 | Schmeichel et al. |
| 4,790,864 A | 12/1988 | Kostun |

(Continued)

FOREIGN PATENT DOCUMENTS

| CA | 2057592 A1 | 6/1992 |
| CN | 201486706 U | 5/2010 |

(Continued)

OTHER PUBLICATIONS

International Search Report and Written Opinion for International Patent Application No. PCT/EP2019/053638, dated Oct. 14, 2019, 17 pages.

(Continued)

*Primary Examiner* — Robert A Hopkins
*Assistant Examiner* — Qianping He
(74) *Attorney, Agent, or Firm* — Withrow & Terranova, PLLC

(57) ABSTRACT

The invention relates to a filter element for mounting in an air cleaner housing of a vehicle. The filter element comprises a circumferential filtering wall through which air is allowed to enter. The filter element also comprises a first end and an open second end for fluidly connecting the filter element to a turbo. The open second end is located opposite the first end. The circumferential filtering wall extends from the first end towards the open second end. The filter element further comprises a resonator. The entire resonator is encircled by the circumferential filtering wall such that air entering through the circumferential filtering wall passes on the outside of the resonator to and through the open second end.

10 Claims, 6 Drawing Sheets

(51) Int. Cl.
  *B01D 46/52* (2006.01)
  *F02M 35/02* (2006.01)
  *F02M 35/024* (2006.01)
  *F02M 35/12* (2006.01)
  *F02M 35/14* (2006.01)
  *F02M 35/16* (2006.01)

(52) U.S. Cl.
  CPC .... *F02M 35/0201* (2013.01); *F02M 35/0202* (2013.01); *F02M 35/024* (2013.01); *F02M 35/02483* (2013.01); *F02M 35/1255* (2013.01); *F02M 35/14* (2013.01); *F02M 35/164* (2013.01); *B01D 2279/60* (2013.01)

(58) Field of Classification Search
  USPC ............................................................ 95/25
  See application file for complete search history.

(56) References Cited

U.S. PATENT DOCUMENTS

| | | | |
|---|---|---|---|
| 6,419,718 | B1 | 7/2002 | Klug et al. |
| 8,900,356 | B2 | 12/2014 | Bouhanna |
| 2003/0126841 | A1 | 7/2003 | Pettipiece |
| 2007/0000467 | A1 | 1/2007 | Shaw et al. |
| 2014/0102060 | A1 | 4/2014 | Kato et al. |
| 2014/0102304 | A1 | 4/2014 | Bouhanna |
| 2015/0101299 | A1* | 4/2015 | Osendorf ........... B01D 46/2414 55/502 |
| 2016/0102637 | A1 | 4/2016 | Desjardins |
| 2017/0138322 | A1 | 5/2017 | Cho et al. |
| 2022/0145836 | A1 | 5/2022 | Ribeiro et al. |

FOREIGN PATENT DOCUMENTS

| | | | |
|---|---|---|---|
| DE | 1805381 | U | 2/1960 |
| DE | 202008010504 | U1 | 12/2009 |
| DE | 10110029 | B4 | 10/2012 |
| DE | 102013207586 | A1 | 11/2013 |
| FR | 985029 | A | 7/1951 |
| FR | 1586317 | A | 2/1970 |
| GB | 472452 | A | 9/1937 |
| GB | 1315163 | A | 4/1973 |
| JP | S58163668 | U | 10/1983 |
| JP | H0542664 | U  * | 6/1993 |
| JP | H0542664 | U | 6/1993 |
| JP | H06159175 | A | 6/1994 |
| KR | 200471422 | Y1 | 3/2014 |

OTHER PUBLICATIONS

International Preliminary Report on Patentability for International Patent Application No. PCT/EP2019/053638, dated Feb. 17, 2021, 10 pages.
First Office Action for Chinese Patent Application No. 20198091380.5, dated Dec. 28, 2022, 7 pages.
First Office Action for Chinese Patent Application No. 201980094017.9, dated Feb. 8, 2023, 9 pages.
Intention to Grant for European Patent Application No. 19712930.7, dated Oct. 27, 2022, 35 pages.
International Search Report and Written Opinion for International Patent Application No. PCT/EP2019/056546, dated Oct. 11, 2019, 17 pages.
International Preliminary Report on Patentability for International Patent Application No. PCT/EP2019/056546, dated Feb. 16, 2021, 10 pages.
Non-Final Office Action for U.S. Appl. No. 17/439,129, mailed Mar. 19, 2024, 10 pages.

* cited by examiner

FILTER ELEMENT FOR MOUNTING IN AN AIR CLEANER HOUSING OF A VEHICLE

This application is a 35 USC 371 national phase filing of International Application No. PCT/EP2019/053638, filed Feb. 14, 2019, the disclosure of which is incorporated herein by reference in its entirety.

TECHNICAL FIELD

The invention relates to a filter element for mounting in an air cleaner housing of a vehicle. The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Most trucks today are powered by internal combustion engines. In order to keep the air used in the combustion process clean, the outside air is cleaned through an air filter provided in an air cleaner. Such an air filter is normally replaced on a regular basis (for instance, from on a monthly basis up to on a bi-annual basis) in order to keep the air cleaning function at a desired level. The air filter and air cleaner can be designed in many different shapes and configurations. The most common solution in today's trucks is to use a cylindrical air cleaner with a cylindrical air filter. Trucks are commonly provided with a turbocharger (also referred to simply as a "turbo") for increasing the efficiency and power output of the internal combustion engine. An air filter may, for instance, be provided upstream of the turbo.

When intake valves of an internal combustion engine are opened a noise is generated and tends to propagate all the way to the air cleaner and eventually enter the cab of the truck. Such noise may be experienced by the driver as a disturbance and cause irritation. Thus, it would be desirable reduce such noise propagation and increase the comfort inside the cab.

DE 101 10 029 B4 discloses a ring filter insert for an intake air filter of an internal combustion engine. The ring filter insert has an annular filter element which at its axial end is connected to an end plate. The annular filter element extends from the end plate towards an outlet. From the other side of the end plate a resonator extends in the opposite direction. The chamber of the resonator communicates with the interior of the filter element via an opening in the end plate. While this kind of arrangement has the advantage of providing a sound attenuating function, the provision of the resonator comes with disadvantages. The whole arrangement becomes more bulky than if no resonator would have been used or, if that disadvantage is to be avoided, the effective filter area must be reduced which would affect the air cleaning function.

SUMMARY

An object of the invention is to provide a filter element for mounting in an air cleaner housing of a vehicle, which filter element alleviates the above mentioned drawbacks of the prior art.

According to a first aspect of the invention, the object is achieved by a filter element to claim 1. The filter element comprises a circumferential filtering wall through which air is allowed to enter,
a first end,
an open second end for fluidly connecting the filter element to a turbo, the open second end being located opposite the first end, wherein the circumferential filtering wall extends from the first end towards the open second end, and
a resonator,
wherein the entire resonator is encircled by the circumferential filtering wall such that air entering through the circumferential filtering wall passes on the outside of the resonator to and through the open second end.

The present invention is based on the realization that an efficient sound attenuation may be obtained without compromising on size or cleaning efficiency by locating a resonator in the space defined by circumferential filter walls, for instance, placing the resonator coaxially encircled by the filter walls.

By the provision of a filter element which comprises a resonator encircled by the filter walls, no additional bulkiness is added, i.e. unlike DE 101 10 029 B4 in which the resonator results in an extra axial length of the entire arrangement (or if the same axial length is to be kept, the available filtering area must be reduced), the present invention has the advantage of allowing the same size and cleaning efficiency to be maintained as a filter element without a resonator. This also has the further advantage, that today's existing filter elements in air cleaner housings, which need to be replaced, can be replaced by the inventive filter element, providing the additional benefit of sound attenuation.

By placing the resonator in such way that air that enters through the circumferential filtering wall then passes on the outside of the resonator, for example along the resonator, an adequate fluid flow may be provided to any component (such as a turbo) which is directly or indirectly connected to the open second end of the filter element.

According to one exemplary embodiment, the first end is a closed first end, wherein the resonator extends from the closed first end towards the open second end. The closed first end may, for instance, be formed in one piece with the circumferential filtering wall, or may be formed separately and then attached to the circumferential filtering wall. Thus, the closed first end may form a bottom of the cylindrical filter element. Because of the closed first end there is no need to provide any additional communication means (such as an opening) between the resonator and the rest of the filter element, but instead a solid and sturdy first end may be provided. Furthermore, an advantage of having the resonator extending from the closed first end is that the closed first end may, if desired, provide a bottom end of the resonator if the resonator is not designed with its own individual bottom end.

According to one exemplary embodiment, the resonator is formed in one piece with the first end and the circumferential filtering wall. Thus, the resonator may form an integral part of the filter element. An advantage of this is that it may be manufactured in one moulding process, simplifying the manufacturing of the filter element. More specifically, the circumferential filtering wall may comprise an inner wall part or cage and a surrounding outer wall part with a filter material. In such case, the resonator may be formed in one piece with the first end and the inner wall part of the circumferential filtering wall.

According to one exemplary embodiment, the resonator is releasably attachable to the first end. This has the advantage of allowing the reuse of the resonator when the filter element needs to be replaced. Thus, the resonator may be detached from the old filter element and then attached to become part of a new filter element which is to be mounted in the air cleaner housing of the vehicle.

According to one exemplary embodiment, the resonator has the general shape of a straight cylinder having a closed bottom located at the first end and an open top. This allows for simple manufacturing and dimensioning of a resonance chamber within the resonator.

According to one exemplary embodiment, the resonator has the general shape of a straight circular cylinder. This also allows for simple manufacturing and dimensioning of a resonance chamber within the resonator. Additionally, when being surrounded by a circular filtering wall a uniform airflow around the resonator may be provided.

According to one exemplary embodiment, the resonator has a top edge defining an opening through which sound waves are allowed to enter into, and exit out from, the resonator, wherein the top edge is formed as a circumferentially extending crest having a radius. A curved crest is advantageous for the aerodynamics of the airflow, thus reducing the risk of noise emanating from the airflow.

Normally, apart from the physical length of the resonator an additional air volume outside the resonator will also take part in the actual resonating function. Thus, the effective resonator length is slightly greater than the physical length of the resonator. The air column which is generated will be pumping in the enclosed space of the resonator. When air flows around the top of the resonator, the end correction provided by the additional air volume is altered. Put differently, the additional air volume which would have joined in the pumping action will be blown away, and therefore the effective length of the resonator is shortened. This can be seen as a more blurry peak in a sound reduction (attenuation) diagram and having altered frequency. This disturbance of the effective resonator length caused by the flowing air around the resonator, may be mitigated by appropriately shaping the top edge of the resonator, for instance shaped in accordance with at least the following two exemplary embodiments.

According to one exemplary embodiment, the top edge is wave-shaped in the circumferential direction, having alternating peaks and valleys. By making the top edge wave-shaped, the maximum attenuation will be somewhat lowered, but will cover a larger bandwidth, and will not be as sensitive to the air flow.

According to one exemplary embodiment, the wave-shape of the top edge is sinusoidal. Again, the maximum attenuation will be somewhat lowered, but will cover a larger bandwidth, and will not be as sensitive to the air flow.

It has been found particularly advantageous for the attenuation and bandwidth coverage to have the peak-to-peak distance, as measured in the circumferential direction from centre to centre of neighbouring peaks, in the range of 10-30 mm, such as 15-25 mm, typically 20 mm.

Furthermore, it has been found particularly advantageous for the attenuation and bandwidth coverage to have the valley-to-peak distance, as measured in the axial direction of the resonator from centre of a valley to centre of a peak, in the range of 5-15 mm, such as 7-13 mm, typically 10 mm.

According to a second aspect of the invention, the object is achieved by a vehicle according to claim 15. Any features, embodiments and advantages of the filter element of the first aspect are analogously present in a vehicle of the second aspect comprising such a filter element.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
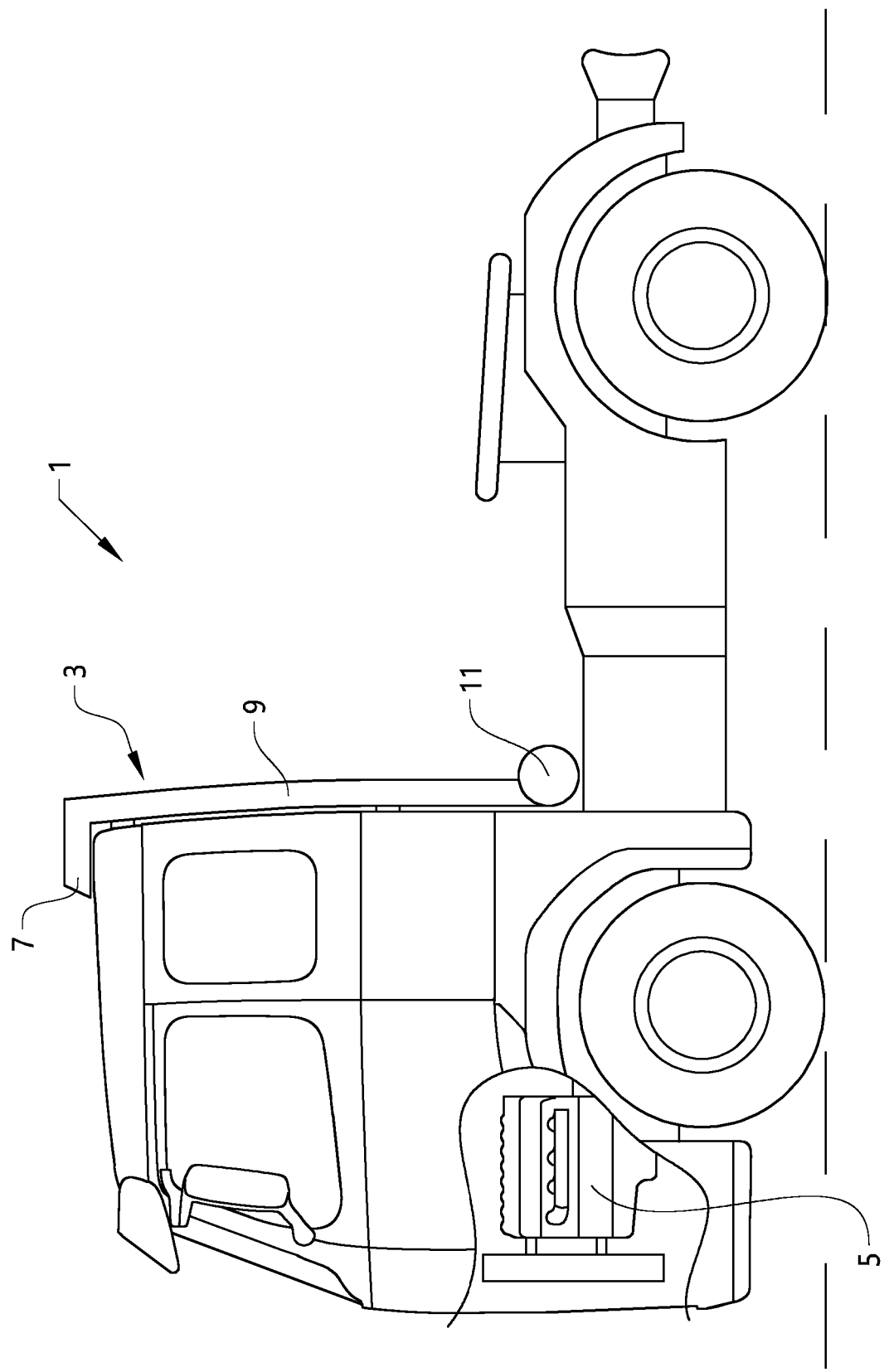
FIG. 1 schematically illustrates a vehicle provided with an air intake arrangement.

FIG. 1 schematically illustrates a vehicle 1 provided with an air intake arrangement 3. In this example, the vehicle 1 is illustrated in the form of a truck, powered by an internal combustion engine 5. However, the filter element of the present invention may well be implemented also in other types of vehicles, such as busses, construction equipment and passenger cars.

Figure 2:
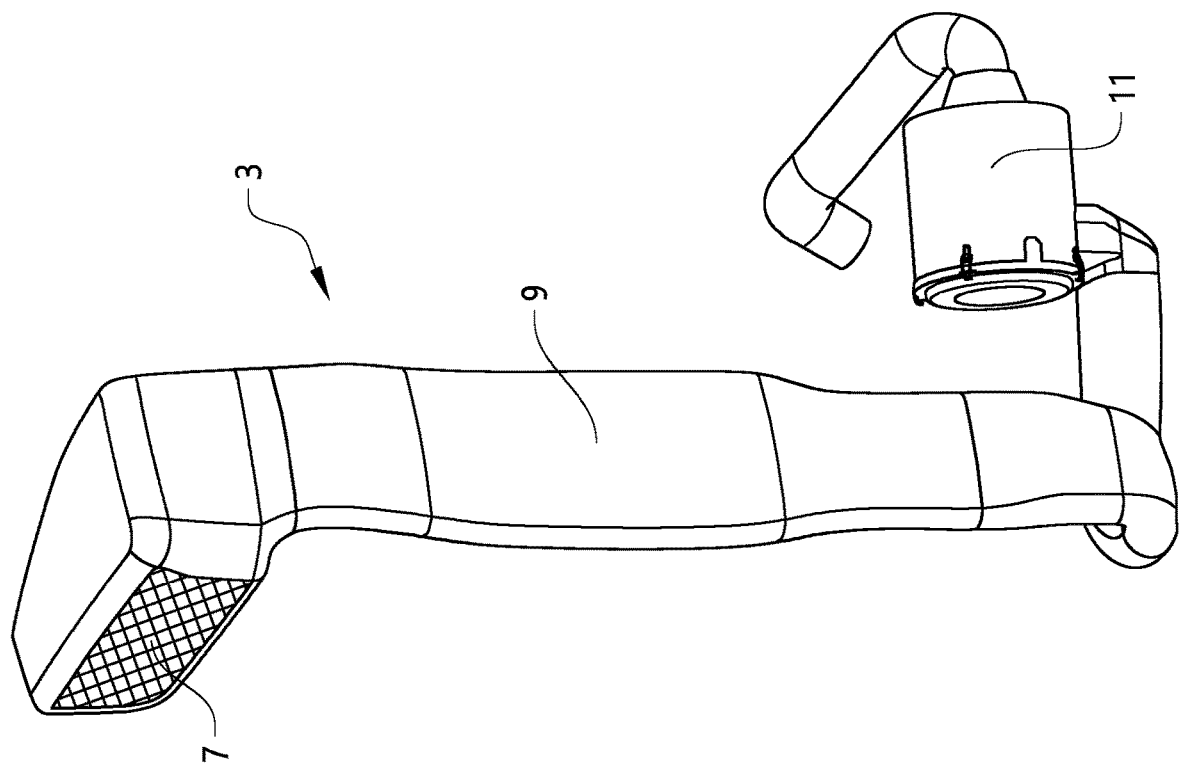
FIG. 2 is a detailed view of the air intake arrangement of FIG. 1, including an air cleaner.

With reference to FIG. 2, which is a detailed view of the air intake arrangement of FIG. 1, the air intake arrangement 3 comprises an air intake 7 in which air enters and moves vertically down an air duct 9. The air flows from the air duct 9 via a connecting elements (such as for example a bellow and turn chamber) to an air cleaner 11. The air cleaner 11 is located in a lower region of the vehicle 1 and the air intake 7 in a higher region of the vehicle. In the depicted embodiment of FIG. 1 the air cleaner 11 is located directly behind a vehicle cab, whereas the air intake 7 is located on top of the vehicle cab at a rear end thereof. The air duct 9 is located at the rear end in a generally vertical position of the vehicle cab. The locations of the parts detailed above may well be otherwise.

Figure 3:
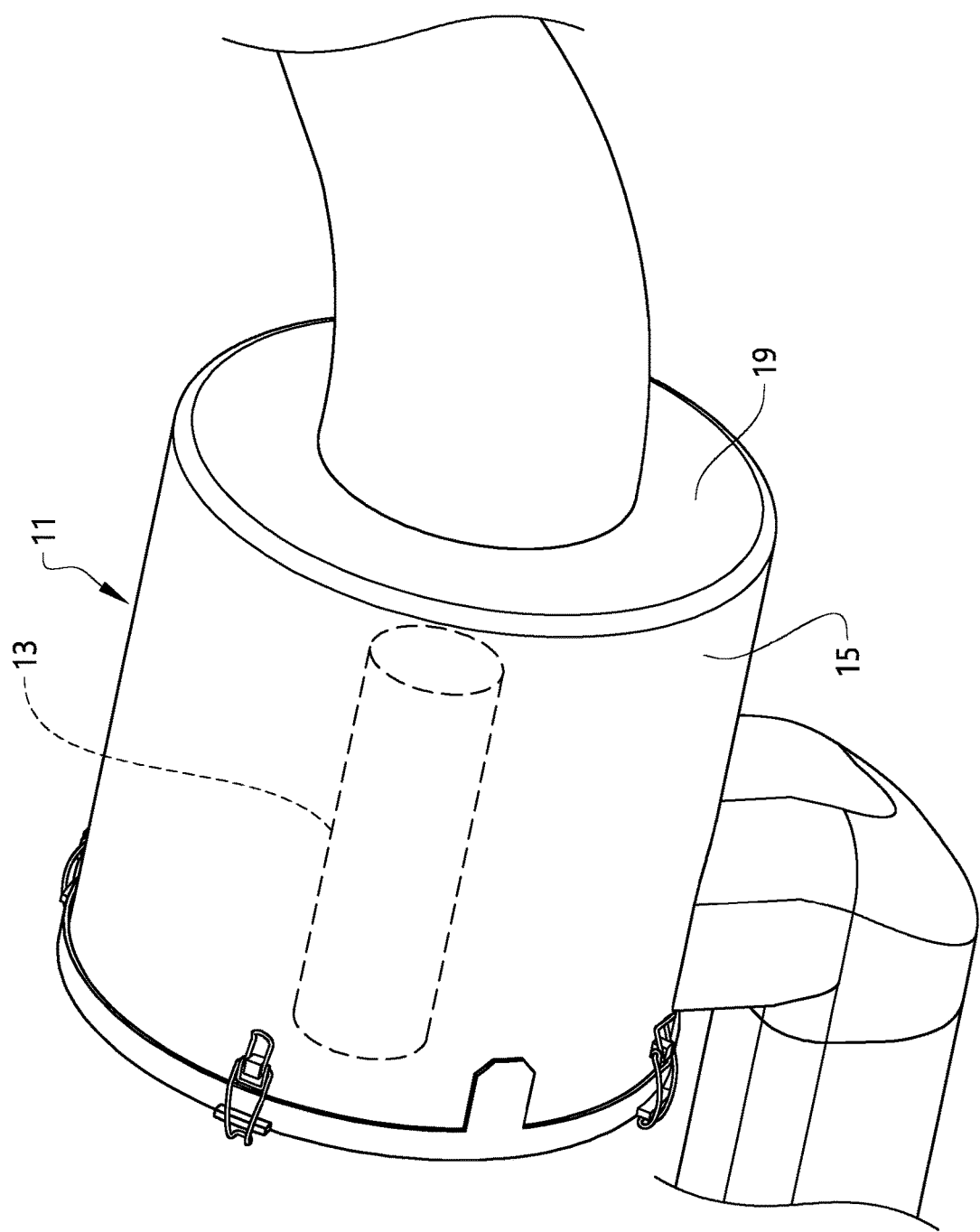
FIG. 3 illustrates a close-up of the air cleaner of FIG. 2, containing a resonator as indicated with dashed lines.

The air cleaner 11 is illustrated as having a generally cylindrical shape, however, other shapes are also conceivable. FIG. 3 illustrates a close-up of the air cleaner 11 of FIG. 2, containing a resonator 13 as indicated with dashed lines. The air cleaner 11 comprises an air cleaner housing 15 and a filter element 17 (visible in FIG. 4) inside the air cleaner housing 15. As can be seen in FIGS. 2 and 3, the air enters the air cleaner housing 15 through its enveloping wall and exits at a top end 19 of the air cleaner housing 15. More specifically, when the air has entered the air cleaner housing 15 the air will spread around the filter element 17 (FIG. 4) and will be directed radially inwardly through the filter element 17 through which the air is filtered. The air is then directed to an outlet 21 of the filter element 17 and via connecting elements (such as an intermediate pipe and a turbo inlet bellow) forwarded to a turbo.

It should be understood that in this disclosure, referral is made to orientational terms such as "top", radial" and "circumferential". These terms should be understood as relating to the filter element 17 (and therefore also the air cleaner housing 15) being defined based on a cylindrical r, θ, z-coordinate system, wherein the coordinate r defines the radially direction, the coordinate θ defines the circumferential/angular direction and the coordinate z defines the axial direction. Accordingly, as will be discussed in more detail below, the first and second ends 23, 25 of the filter element 17, i.e. the open top end 23 and the closed bottom end 25 (which will be discussed below) are spaced from each other in the axial z-direction. The circumferential filtering wall 27 (which will also be discussed below) extends around the circumference of the filter element 17, i.e. in the θ-direction, but also from the bottom end 25 towards the top end 23, i.e. in the z-direction. Thus, it must be understood that even though terms such as top and bottom are used for the filter element 17, they do not relate to the surrounding environment, thus, the top end 23 of the filter element 17 does not have to be located at a vertically higher level compared to the bottom end 25 of the filter element 17, when the filter element 17 is mounted in a vehicle 1 (FIG. 1) standing on horizontal ground. In practice, the top end 23 and bottom end 25 of the filter element 17 may be located essentially at the same level compared to the ground, i.e. the filter element 17 may be mounted so that the z-direction of the filter element 17 extends parallel with the ground on which the vehicle 1 stands.

Figure 4:
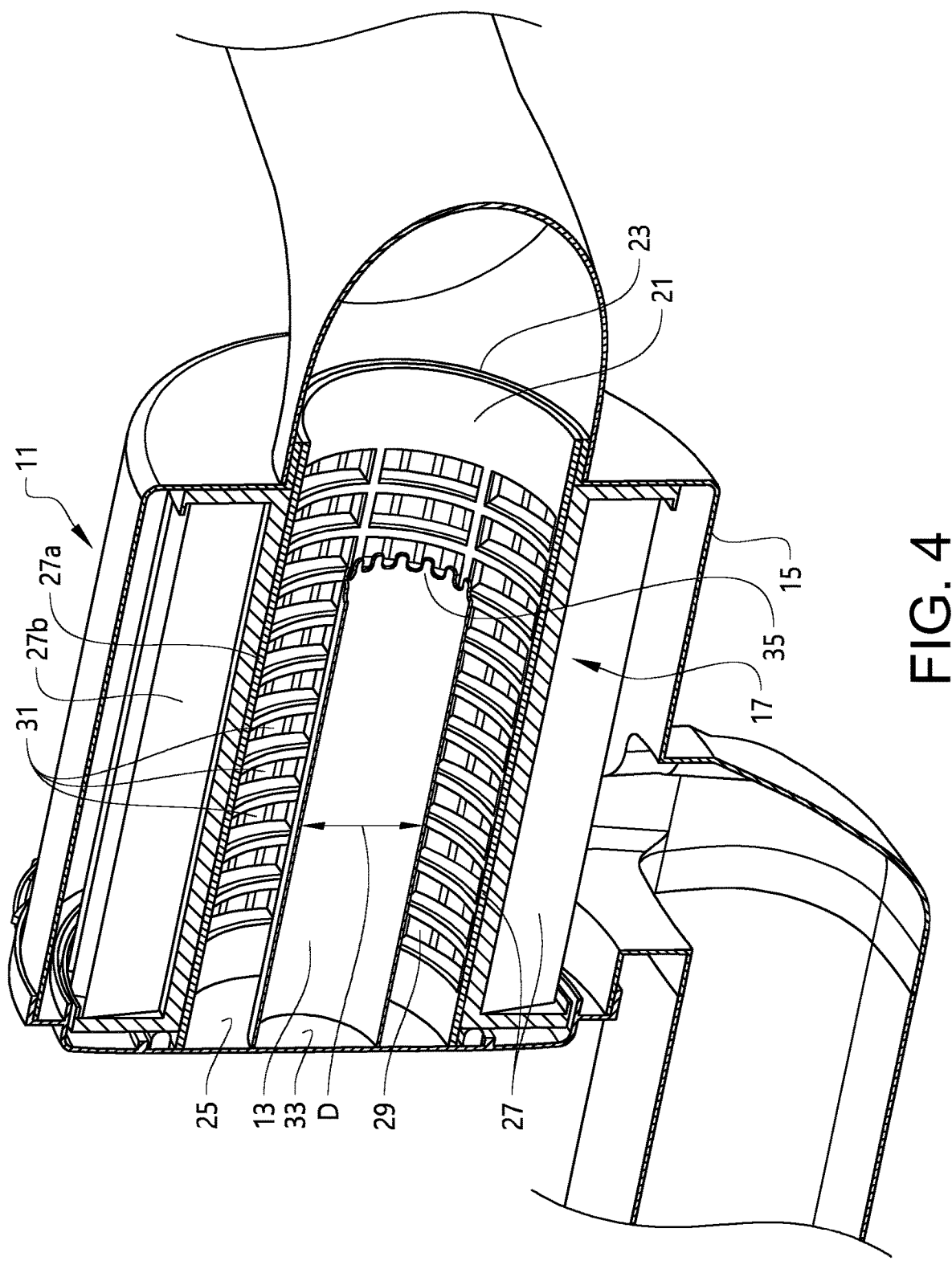
FIG. 4 illustrates a cross-sectional view of the air cleaner of FIG. 3, including an air cleaner housing, a filter element mounted in the air cleaner housing, wherein the filter element is provided with a resonator element, in accordance with an exemplary embodiment of the invention.
Figure 5:
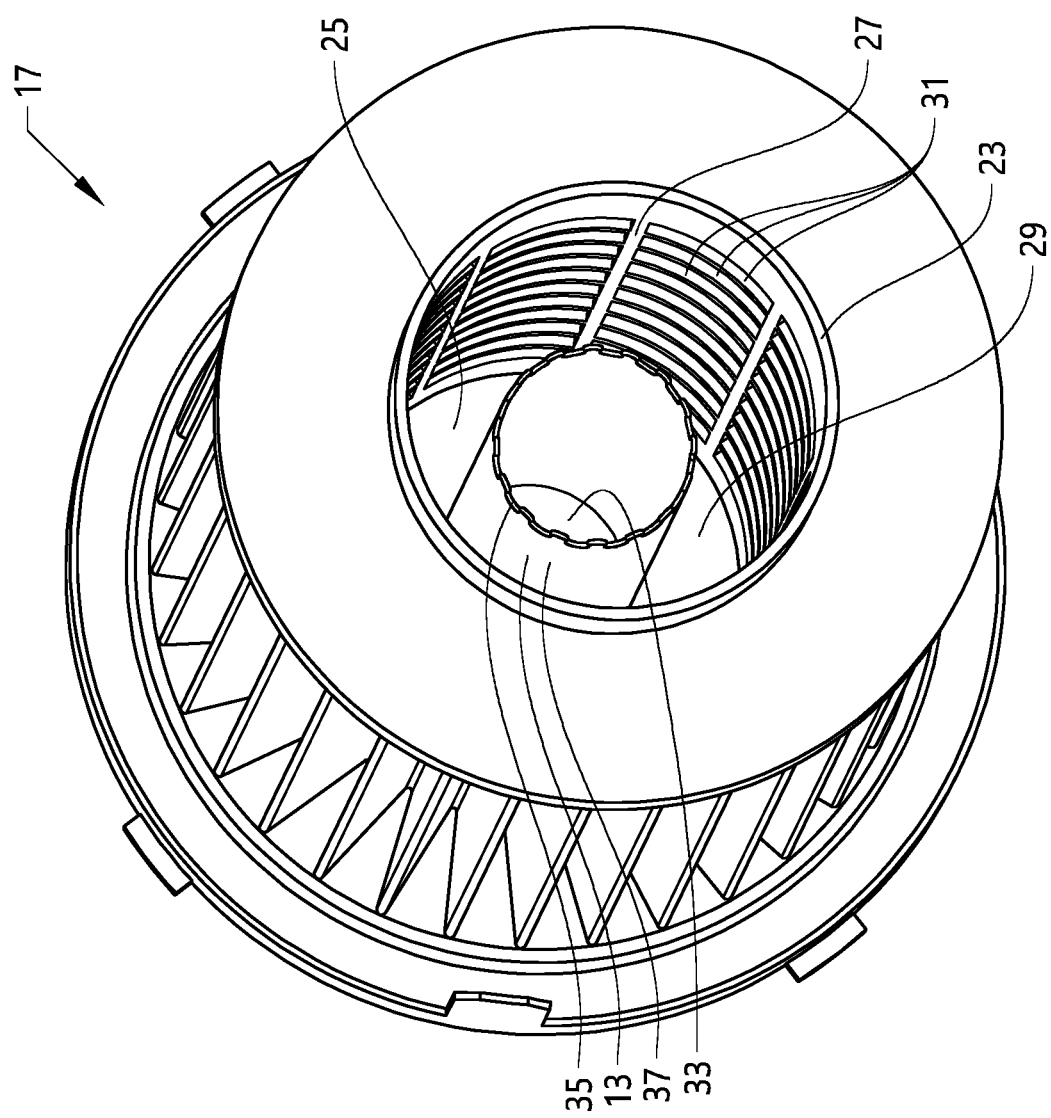
FIG. 5 illustrates a top perspective view of the filter element of FIG. 4, before it is mounted into the air cleaner housing.

FIG. 4 illustrates a cross-sectional view of the air cleaner 11 of FIG. 3, including an air cleaner housing 15, a filter element 17 mounted in the air cleaner housing 15, wherein the filter element 17 is provided with the resonator 13, in accordance with an exemplary embodiment of the invention. FIG. 5 illustrates a top perspective view of the filter element 17 of FIG. 4, before it is mounted into the air cleaner housing 15.

With reference to FIGS. 4 and 5, the filter element 17 is adapted to be removably arranged in the air cleaner housing 15, which is shown in FIG. 4. The filter element 17 has a generally circular cylindrical tubular shape defining an inner space 29. In the radial direction, the inner space 29 is defined by the circumferential filtering wall 27. The circumferential filtering wall 27 may for example comprise an inner wall part 27a and an outer wall part 27b. The outer wall part 27b may be made of a filter material body which is made of a material such as paper or cellulose, or of any material that is suited for the filtering operation of the air to be filtered. The filter material body may have a corrugated or pleated surface, but may also be made otherwise and of other suitable materials, or material combinations. The inner wall part 27a is provided for maintaining the shape of the filter element 17 and can be regarded as a forming a supporting cage, in use of the filter element 17 when air is filtered through the outer wall part 27b. When the outer wall part 27b is made of a relatively flexible material and design, it could otherwise collapse due to air pressure during use. The inner wall part 27a is tubular and air permeable, and may be made of plastic (such as polypropylene) or metallic material. The inner wall part 27a is here illustrated as being provided with elongated slits 31, however, other configurations, such as mesh or net-shaped openings could be provided.

The filter element has a first end 25, here illustrated as a closed first end, i.e. as a bottom end 25 of the filter element 17. Opposite to the bottom end 25, the filter element 17 has an open second end 23, i.e. an open top end 23, for fluidly connecting the filter element 17 to a turbo. The circumferential filtering wall 27 extends from the closed bottom end 25 towards the open top end 23. Thus, apart from the circumferential filtering wall 27, the bottom end 25 also defines the inner space 29. As can be seen in FIG. 4, the outlet 21 of the filter element 17 is located at the top end 23 of the filter element 17, wherein the outlet 21 is in communication with the inner space 29.

The filter element 17 further comprises the resonator 13 provided in the inner space 29. The resonator 13 is encircled by the circumferential filtering wall 27 such that air entering through the circumferential filtering wall 27 passes on the outside of the resonator 13 to and through the outlet 21 at the top end 23. The resonator 13 is illustrated as having a substantially tubular cylindrical shape and extending coaxially with the circumferential filtering wall 27. The resonator 13 is thus, located at the central geometrical axis of the filter element 17, while the circumferential filtering wall 27 is radially spaced from the resonator 13.

The resonator 13 may suitably have a shape which corresponds to the shape of the circumferential filtering wall 27, but with smaller dimension. In the illustrated example embodiment, the resonator 13 is shaped like a straight circular cylinder, similarly to the circumferential filtering wall 27. However, other cross-sectional shapes, such as rectangular, are also conceivable. The resonator 13 has a closed bottom 33, here represented by the first end 25 of the filter element, and an open top 35. The open top 35 is in this embodiment located slightly below the outlet 21 of the filter element 17.

According to one exemplary embodiment, the resonator 13 has a cross-sectional area, calculated as $\pi \cdot (D/2)^2$, where D is the inner diameter of the resonator, the cross-sectional area being in the range of 4000-25000 mm$^2$, such as 4500-6000 mm$^2$, for example 4700-5600 mm$^2$, typically 4900-5300 mm$^2$. According to one exemplary embodiment, the resonator 13 has an axial length in the range of 100-400 mm, such as 250-400 mm, for example 310-370 mm, typically 320-340 mm. A resonator 13 having such a cross-sectional area and length fits most standard heavy duty truck filter element sizes. The illustrated resonator 13 may, for instance, have a cross-sectional area of approximately 5000 mm$^2$ and a length of approximately 330 mm.

As illustrated in FIGS. 4 and 5 the resonator 13 extends from the closed first end 25, i.e. bottom end, towards the open second end 23, i.e. top end, of the filter element 17. However, it would be conceivable to mount the resonator 13 separately from the first end of the filter element 17, for instance, by means of radially extending supporting spokes. The resonator 13 is suitably formed in one piece with the first end 25 and the circumferential filtering wall 27, and more specifically the inner wall part 27a (cage) of the circumferential filtering wall 27. The inner wall part 27a, the first end 25 and the resonator 13 may, for instance, be moulded in one piece. In other embodiments, the resonator 13 may be formed as a separate unit which is releasably attachable to the first end 25, for instance by a bolt/nut connection or other releasable fastening means.

Regardless of being made in one piece with or as a separate piece of the filter element 17, the bottom 33 of the resonator 13 may suitably be defined by the first end 25 of the filter element 17. Thus, the cylindrical wall 37 of the resonator as well as the circumferential filtering wall 27 will both extend from the first end 25 of the filter element 17.

Figure 6:
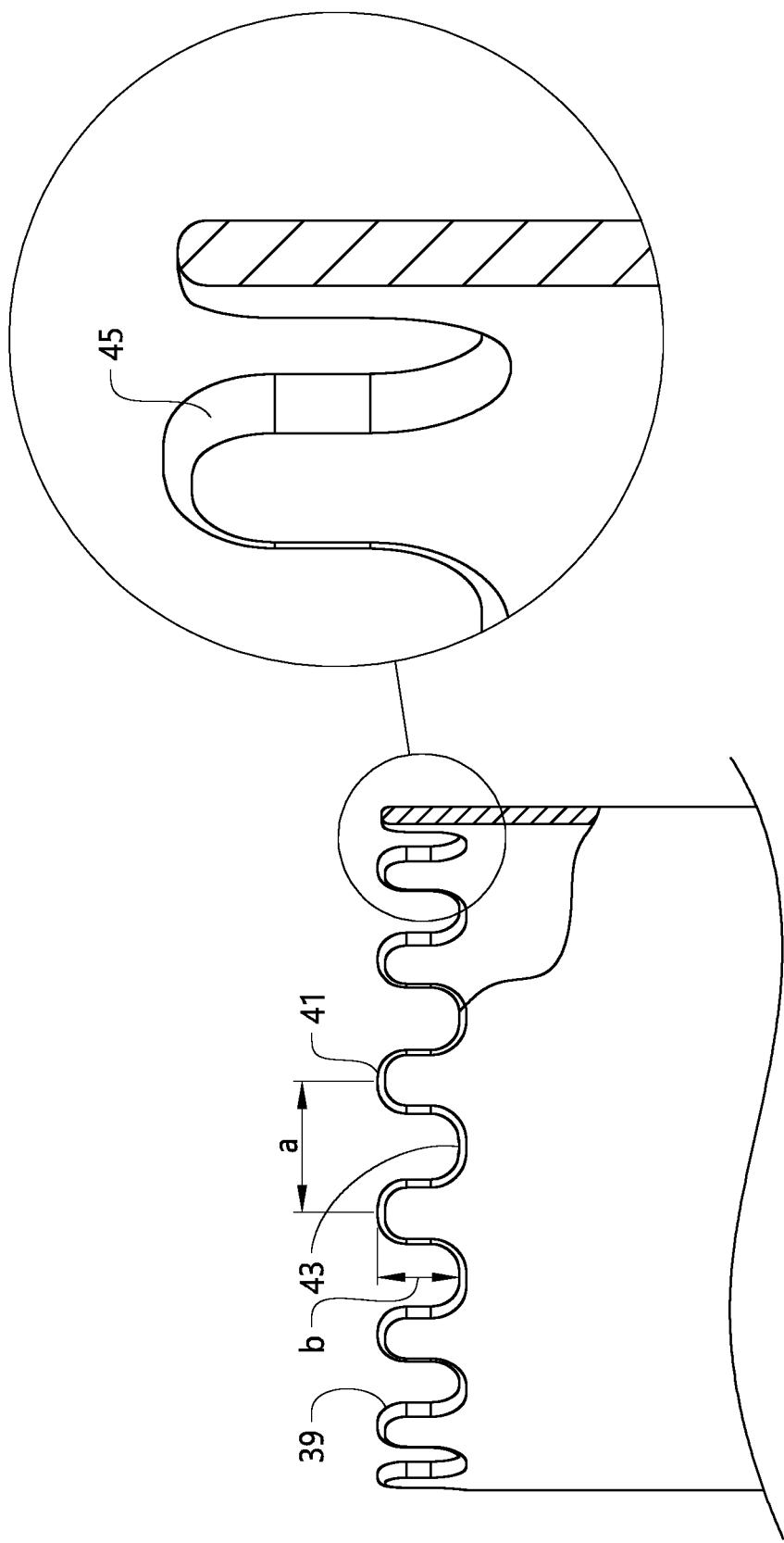
FIG. 6. illustrates a detailed view of the top edge of the resonator.

As illustrated in the detailed view of FIG. 6, the resonator 13 has a top edge 39 defining the opening through which sound waves are allowed to enter into (and exit out from) the resonator 13, in order to attenuate noise propagating to the air cleaner 11 all the way from the intake valves of the internal combustion engine 5 (FIG. 1) when they are opened. Accordingly, the resonator 13 has an inside and an outside. The inside of the resonator 13 defines a physical resonator volume. The outside of the resonator 13 will be subjected to the radially entering air from the circumferential filtering wall 27, which air will flow axially towards the outlet 21 of the filter element 17 and along the outside of the resonator 13.

The top edge 39 is wave-shaped in the circumferential direction, having alternating peaks 41 and valleys 43. Various wave shapes are conceivable. According at least some exemplary embodiments the wave-shape of the top edge 39 is sinusoidal.

In addition to the physical volume inside the resonator 13 an additional air volume outside the resonator 13 will also take part in the actual resonating function, thus providing an effective resonator length/volume which is slightly greater than the physical length/volume of the resonator 13. As explained above, the air column which is generated will be pumping in enclosed volume of the resonator. When air flows around the top of the resonator 13, the end correction provided by the additional air volume is altered. The additional air volume which would have joined in the pumping action will be blown away, and therefore the effective length of the resonator 13 is shortened. This can be seen as a more blurry peak in a sound reduction (attenuation) diagram and having altered frequency. This disturbance of the effective resonator length caused by the flowing air around the resonator 13, may be mitigated by providing an irregular top edge 39 as illustrated in FIG. 6.

In particular it has been found that a satisfactory attenuation and large bandwidth coverage may be obtained for a peak-to-peak distance a, as measured in the circumferential direction from centre to centre of neighbouring peaks, in the range of 10-30 mm, such as 15-25 mm, typically 20 mm, and similarly it has been found advantageous to have the valley-to-peak distance b, as measured in the axial direction of the resonator 13 from centre of a valley to centre of a peak, in the range of 5-15 mm, such as 7-13 mm, typically 10 mm. The above ranges for the peak-to-peak distance a and the peak-to-valley distance b may be provided for any wave-shaped top edge 39, and in particular for a sinusoidal wave-shape. With these embodiments the sound attenuating effect of the resonator 13 will be less sensitive to the air flow entering through the circumferential filtering wall.

As can been seen in the encircled enlargement of the cut-away part drawn in FIG. 6, the top edge 39 is formed as a circumferentially extending crest 45 having a radius. In other words the top edge 39 forms an arched/curved transition from the inside of the resonator 13 to the outside of the resonator 13. This too provides better attenuation effect, as the shape is more aerodynamically shaped than if sharp edges would have been provided, and the airflow will therefore cause less disturbance to the effective resonator volume.

It is to be understood that the present invention is not limited to the embodiments described above and illustrated in the drawings; rather, the skilled person will recognize that many changes and modifications may be made within the scope of the appended claims.

The invention claimed is:

1. A filter element for mounting in an air cleaner housing of a vehicle, comprising:
   a circumferential filtering wall through which air is allowed to enter,
   a first end,
   an open second end for fluidly connecting the filter element to a turbo, the open second end being located opposite the first end, wherein the circumferential filtering wall extends from the first end towards the open second end,
   a resonator, wherein the entire resonator is encircled by the circumferential filtering wall such that air entering through the circumferential filtering wall passes on the outside of the resonator to and through the open second end,
   wherein the resonator has a top edge defining an opening through which sound waves are allowed to enter into, and exit out from, the resonator, and
   wherein the top edge is wave-shaped in a circumferential direction, having alternating peaks and valleys.

2. The filter element of claim 1, wherein the first end is a closed first end, wherein the resonator extends from the closed first end towards the open second end.

3. The filter element of claim 1, wherein the resonator is formed in one piece with the first end and the circumferential filtering wall.

4. The filter element of claim 1, wherein the resonator is releasably attachable to the first end.

5. The filter element of claim 1, wherein the resonator has a length in a range of 100-400 mm.

6. The filter element of claim 1, wherein the top edge is formed as a circumferentially extending crest having a radius.

7. The filter element of claim 1, wherein the wave-shape of the top edge is sinusoidal.

8. The filter element of claim 1, wherein a peak-to-peak distance, as measured in a circumferential direction from center to centre of neighboring peaks, is in a range of 10-30 mm.

9. The filter element of claim 1, wherein a valley-to-peak distance, as measured in an axial direction of the resonator from center of a valley to center of a peak, is in a range of 5-15 mm.

10. A vehicle comprising:
    a filter element mounted in an air cleaner housing of the vehicle, comprising:
    a circumferential filtering wall through which air is allowed to enter,
    a first end,
    an open second end for fluidly connecting the filter element to a turbo, the open second end being located opposite the first end, wherein the circumferential filtering wall extends from the first end towards the open second end,
    a resonator, wherein the entire resonator is encircled by the circumferential filtering wall such that air entering through the circumferential filtering wall passes on the outside of the resonator to and through the open second end,
    wherein the resonator has a top edge defining an opening through which sound waves are allowed to enter into, and exit out from, the resonator, and
    wherein the top edge is wave-shaped in a circumferential direction, having alternating peaks and valleys.

* * * * *